Patented Feb. 14, 1950

2,497,268

UNITED STATES PATENT OFFICE 2,497,268

PERMANENT MAGNETS AND METHOD FOR THE OBTENTION OF THE SAME

Louis Neel, Grenoble, France, assignor to Societe d'Electro-Chimie, d'Electro-Metallurgie et des Acieries Electriques d'Ugine, Paris, France, a corporation of France No Drawing. Application March 28, 1945, Serial No. 585,398. In France July 26, 1944

4 Claims. (Cl. 175—22)

It is well known that powders basically composed of one or more ferro-magnetic metals the grains of which offer ultra-microscopic dimensions are particularly suitable for the manufacture of permanent magnets of a high quality through agglomeration and magnetization.

Such powders, basically composed of iron for instance, can be obtained among others by causing a solution of an iron hydroxide or other salt to crystallize and then by decomposing the so obtained crystals and reducing them at low temperatures in well determined conditions. Such a powder, when agglomerated under a pressure of 5 tons per square centimetre for instance, yields permanent magnets for which the coercive force is equal to about 400 oersteds and the remanent induction to 5,500 gauss.

The present invention relates to a method by which it is possible to obtain powders basically composed of iron, capable of yielding permanent magnets of a still better quality more particularly as regards their coercive force and this without increasing their cost.

The invention also relates to powders having the chemical and physical constitution of those obtained by the application of said method.

The method according to the invention fundamentally consists in provoking the crystallization of a mixed solution of an iron compound decomposable by heat at temperatures lower than 500° C. while giving rise either directly to iron or to an oxidized compound of the latter reducible at a temperature lower than 500° C., and of an oxygenated salt as, for instance, a formate or an oxalate of one or more metals the oxides of which show a high formation heat such as, for instance, calcium, magnesium, aluminum or cadmium, whereafter the quasi-totality of the iron compound is brought to the metallic state by decomposing the so obtained crystals by heat in a neutral or reducing atmosphere at a temperature lower than 500° C. and proceeding, if necessary, to a complementary reduction of the decomposition products by a reducing gas at a temperature lower than 500° C.

One obtains thus, by comparatively simple and not very expensive means, powders the particles of which show ultra-microscopic dimensions and which, once agglomerated and magnetized, yield magnets of a higher quality than those obtained through agglomeration of ultra-microscopic pure iron powders.

As iron compound decomposable by heat one preferably uses iron formate, oxalate or acetate.

In order to simplify the following explanations, only lime and calcium salts are mentioned hereunder, but it is to be well noted that said bodies can be substituted totally or partially, for instance, by magnesia, alumina or cadmium oxide or by oxygenated salts of the corresponding metals.

The above mentioned mixed solution can be obtained in various manners. One can, for instance, directly put into solution the iron compound and the oxygenated calcium salt in the same solvent or mix together previously prepared solutions of each of these bodies or dissolve the calcium salt into a solution of the iron compound or conversely.

Another very advantageous means for obtaining the mixed solution consists in forming the calcium salt and/or the iron compound at the same time as the solution is prepared. For this purpose, lime can be added to a solution of an oxygenated iron salt or—and it is this method which has given the most advantageous results—iron, for instance in the form of waste or turnings, and lime can be added successively to a solution of an acid corresponding to the salts to be formed as, for instance, formic, oxalic or acetic acid.

The proportion of lime or calcium salt introduced into the original solution must be such that after precipitation the obtained crystals contain from 0.1 to 10% of CaO. The quantity of lime or of salt to be added to the solution in order to obtain this result can be easily determined by means of preliminary tests. By adding, for instance, to a 10% solution of iron formate, 40 grammes of lime per litre of solution, one obtains crystals containing about 1% of CaO and by adding to the same solution 15 grammes of lime per litre one obtains crystals with about 0.4% of CaO.

The precipitation of the crystals is effected by any known means, for instance by cooling, after which the crystals are desiccated and dried.

The decomposition and the reduction of the obtained crystals—operations which can be performed simultaneously or successively—are effected advantageously at as low temperatures as possible. It is important, in order that the obtained powder offers the best magnetic qualities, that the reducing gas is deprived of oxidizing constituents such as oxygen or steam or contains only a small proportion of such constituents. Furthermore, the gaseous products of the reaction (steam in the case when hydrogen is used as reducing agent) must be rapidly removed from the reaction field. Finally, the reduction must be extended till the iron is for the largest part reduced to a metallic state.

Powders obtained in the above described manner are often pyrophoric and it is necessary, in this case, to embed them into a protecting medium as soon as they leave the reducing atmosphere of the oven. For this purpose, acetone or ether, for instance, can be used advantageously. It is also possible to keep the powders, till they are used, in a vessel containing a reducing gas.

Powders according to the invention offer the following advantages over the known powders prepared without an addition of oxide such as lime or calcium salts:

(a) The same conditions of reduction being established, i. e. for the same temperature of reduction, the same reducing gas, with the same delivery of this latter, etc. . . . the iron-lime powder makes it possible to obtain magnets having a coercive force higher by 20% and more than that of magnets obtained from pure iron powder;

(b) The remanence of iron-lime magnets is, all conditions of manufacture being the same, substantially higher than that of magnets obtained from pure iron powder;

(c) The presence of lime in the crystals makes it possible to carry out the reduction at a temperature higher than that which is used for the pure iron powder while obtaining the same coercive force as with the latter powder.

The agglomeration of the powders with a view to manufacture of magnets can take place with or without the presence of a binding agent and must be effected at a temperature which is sufficiently low in order to prevent, as far as possible, any fritting of the grains. The pressure must be high enough in order that an agglomerated body is obtained which shows satisfactory mechanical characteristic features as well as a convenient resistance against chemical agents; it must not be too high, however, since otherwise the coercive force obtained on the agglomerated body would be too small. Practically, an agglomeration made without a binding agent with pressures of the order of 5 to 10 tons per square centimetre gives excellent commercial results, it being understood that, all other things being equal, the highest coercive forces and the least good remanences are obtained with the smallest pressures.

The following are some examples of execution of the method according to the invention and of the results obtained by this method:

Example I

A solution of formic acid heated up to 100° C. received an addition of iron in the form of waste and turnings; after the reaction was completed such a proportion of lime was added as to obtain a final solution containing 10% iron formate and 10% calcium formate. By cooling said solution, iron formate crystals have been obtained which contained 1% of CaO. Said crystals have been submitted at 320° C. to a decomposition and to a reduction in an atmosphere of hydrogen carefully freed from oxidizing elements and dried. The proportion of hydrogen delivered was 0.1 gramme per minute and per gramme of salt. The obtained powder has been embedded in acetone as soon as it had formed.

The coercive force measured on the non-agglomerated powder amounted to 920 oersteds.

After agglomeration, effected through a simple compression in a cold state under 5 tons per square centimetre and magnetization in the usual manner the coercive force measured on the agglomerate body amounted to 550 oersteds. The remanent induction amounted to 5,800 gauss.

An iron powder obtained in identical conditions of reduction from a solution of iron formate, but without lime, agglomerated under the same pressure and magnetized in the same conditions has given a remanence of 5,500 gauss and a coercive force of only 400 oersteds.

Example II

An iron powder obtained in conditions identical with those of Example I but through reduction at a temperature of 350° C. and agglomerated under the same pressure has given, after magnetization, a remanence of 6,500 gauss and a coercive force of 425 oersteds.

Example III

A powder basically composed of iron, containing 1.5% of magnesia and obtained according to the invention and in a similar manner as described in Example I, the lime being substituted by magnesia, has given through agglomeration in a cold state under a pressure of 5 tons per square centimetre and magnetization in the usual manner magnets showing the following characteristic properties: coercive force: 520 oersteds; remanent induction: 5,400 gauss.

Example IV

A powder obtained as in the preceding example and containing 3.2% of MgO agglomerated and magnetized in the same conditions as in Example III has given magnets showing the following characteristic properties: coercive force: 550 oersteds; remanent induction: 4,900 gauss.

What I claim is:

1. A method of making a permanent magnet, which comprises crystallizing from a solution mixed crystals of iron formate and formate of at least one metal selected from the group consisting of calcium, magnesium, aluminum and cadmium, heating the mixed crystals in a non-oxidizing atmosphere at a temperature below 500° C. until a powder is obtained and the largest part of the iron compound is converted to the metallic state, agglomerating the powder at a temperature below 500° C. and magnetizing the agglomerate.

2. A method of making a permanent magnet, which comprises crystallizing from a solution mixed crystals of iron formate and formate of at least one metal selected from the group consisting of calcium, magnesium, aluminum and cadmium, heating the mixed crystals in a reducing atmosphere at a temperature below 500° C. until a powder is obtained and the largest part of the iron compound is converted to the metallic state, agglomerating the powder at a temperature below 500° C. and magnetizing the agglomerate.

3. A permanent magnet consisting essentially of an agglomerated but unsintered body of pure iron powder and about 0.1% to 10% by weight of a powdered metal oxide having a high formation heat selected from the group consisting of calcium, magnesium, aluminum and cadmium.

4. A method of making a permanent magnet, which comprises crystallizing from a solution mixed crystals of an oxygenated salt of iron and at least one metal selected from the group consisting of calcium, magnesium, aluminum and cadmium, said oxygenated salt being selected from the group consisting of the formates, oxalates and acetates, heating the mixed crystals in a reducing atmosphere at a temperature below 500° C. until a powder is obtained and the largest part of the oxygenated iron salt is converted to the metallic state, agglomerating the powder at a temperature below 500° C. and magnetizing the agglomerate.

LOUIS NEEL.

REFERENCES CITED

The following references are of record in the file of this patent:

UNITED STATES PATENTS

| Number | Name | Date |
| --- | --- | --- |
| 723,159 | Jenkins | Mar. 17, 1903 |
| 1,506,246 | McMahon | Aug. 26, 1924 |
| 1,976,230 | Kato | Oct. 9, 1934 |
| 1,986,197 | Harshaw | Jan. 1, 1935 |
| 2,005,645 | Bond et al. | June 18, 1935 |
| 2,096,009 | Schmid | Oct. 19, 1937 |
| 2,179,810 | Brill et al. | Nov. 14, 1939 |
| 2,188,091 | Baerman | Jan. 23, 1940 |
| 2,254,976 | Powell | Sept. 2, 1941 |
| 2,426,761 | Cambron et al. | Sept. 2, 1947 |

FOREIGN PATENTS

| Number | Country | Date |
| --- | --- | --- |
| 419,953 | Great Britain | Nov. 22, 1934 |
| 590,392 | Great Britain | July 16, 1947 |

OTHER REFERENCES

Comprehensive Treatise on Inorganic and Theoretical Chemistry, vol. 14, page 360; Mellow; 1935. Published by Longmans, Green, and Co., New York.